Jan. 7, 1964   F. MITTELBERGER ETAL   3,117,233
FILTER CAKE THICKNESS DETECTOR FOR FILTERING APPARATUS
Filed June 21, 1961   3 Sheets-Sheet 1
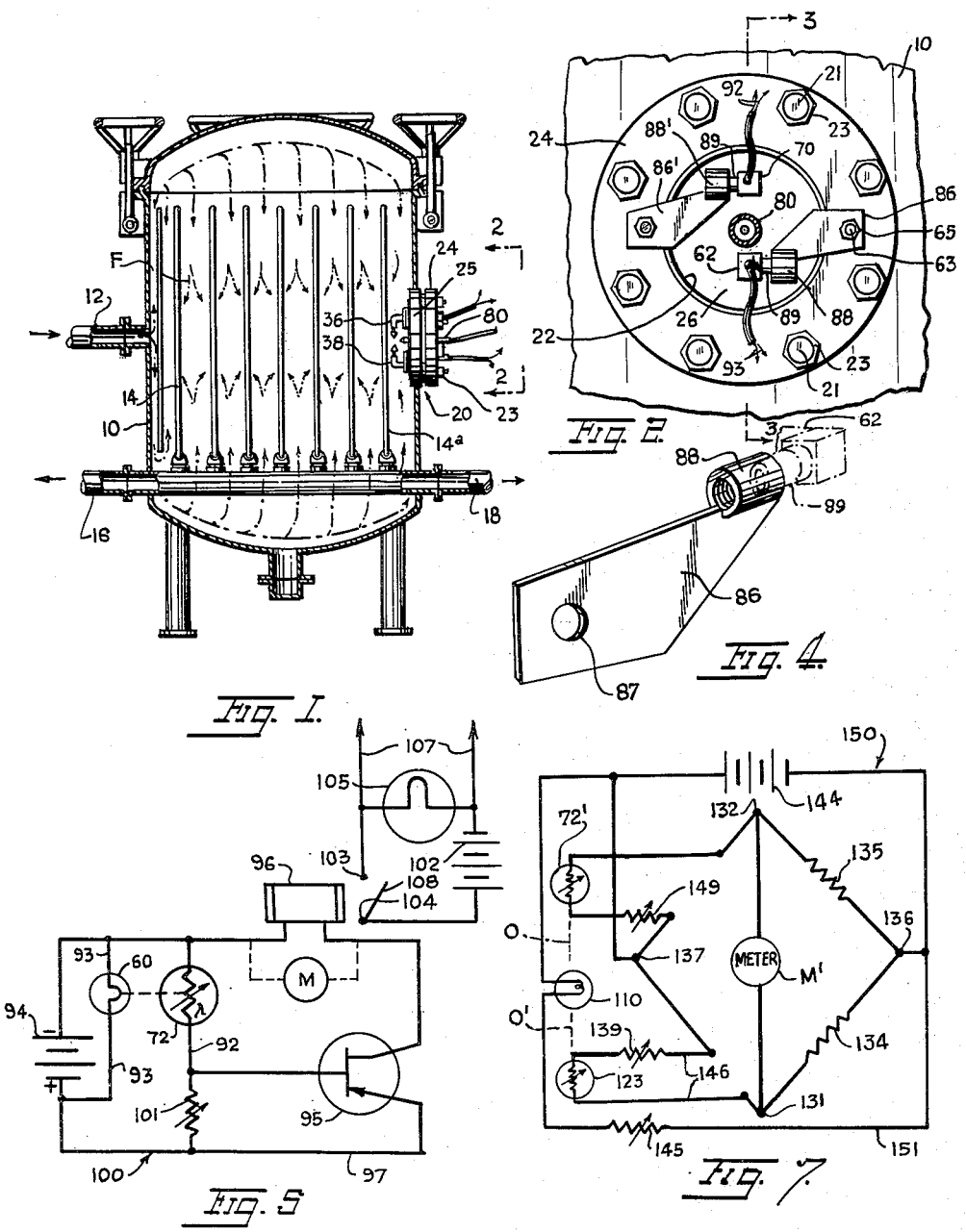
INVENTORS
FRANK MITTELBERGER
STANLEY YOKELL
BY
ATTORNEY

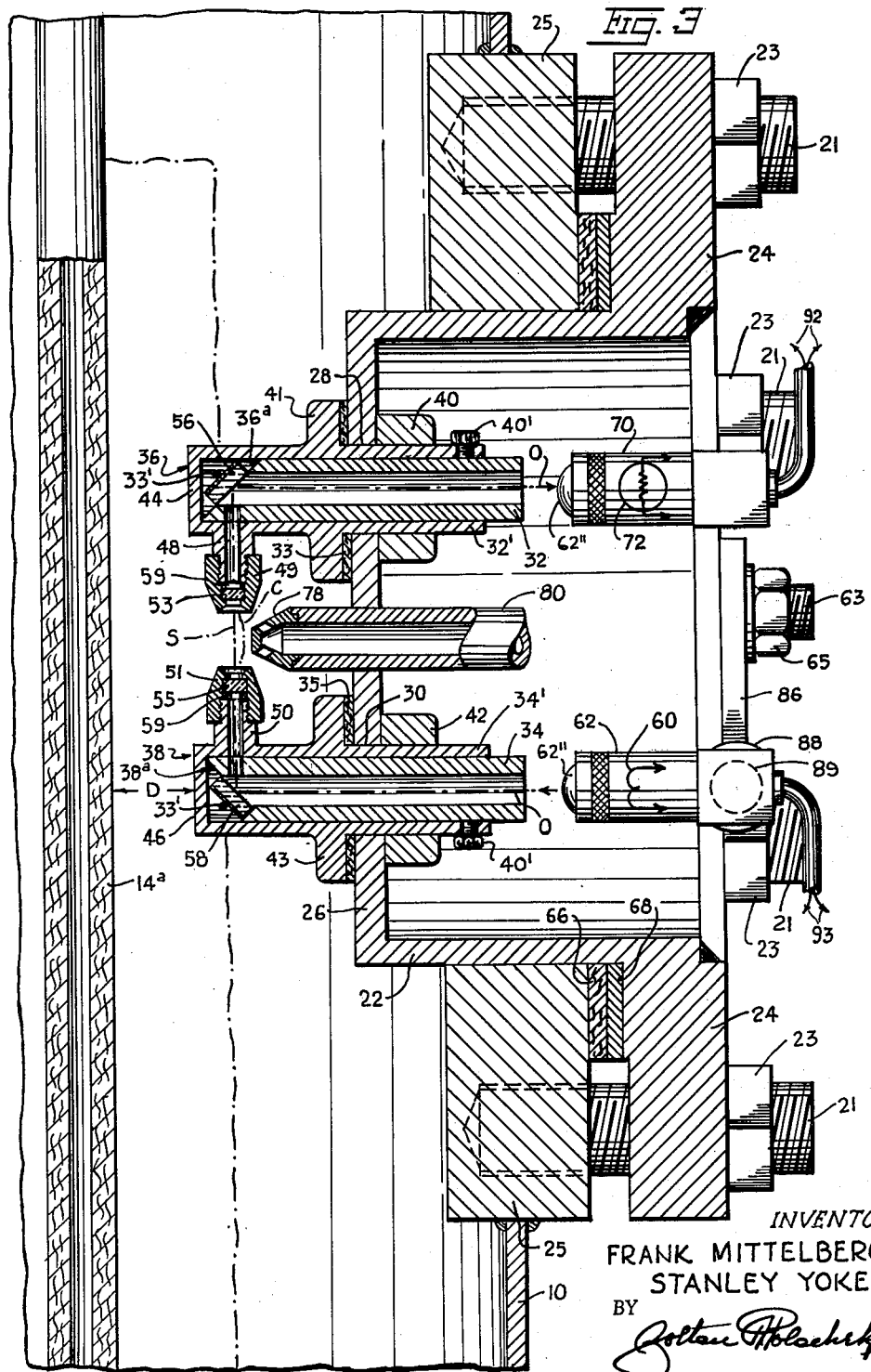

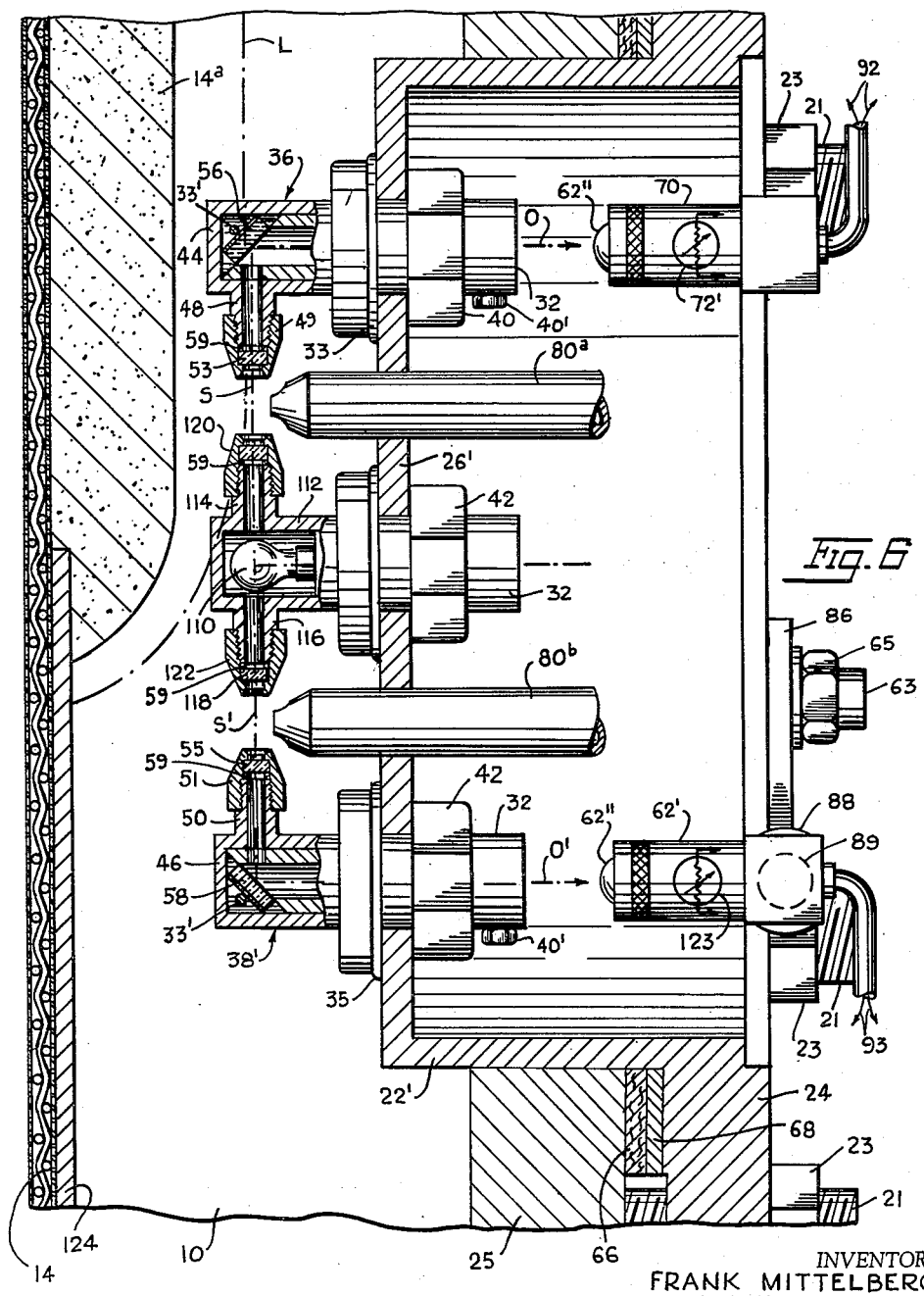

United States Patent Office 3,117,233
Patented Jan. 7, 1964

3,117,233
FILTER CAKE THICKNESS DETECTOR FOR
FILTERING APPARATUS
Frank Mittelberger, Cranford, and Stanley Yokell, Fair Lawn, N.J., assignors to American Plant Equipment Company, Elizabeth, N.J., a corporation of New Jersey
Filed June 21, 1961, Ser. No. 119,015
1 Claim. (Cl. 250—222)

This invention concerns a cake measuring system for a filter apparatus.

A need has long existed for a reliable means of measuring the cake which builds up on filter plates and leaves in filtering apparatus. According to the invention this need is met by a photoelectrically operated apparatus which senses the presence of a filter cake and provides a signal when the cake increases to predetermined thickness. The apparatus may be provided with a device to clean and clear the path scanned by the photoelectric means. In one form of the invention the apparatus is provided with an auxiliary sensing means having a permanently clear light path to serve as a reference standard.

It is one object of the invention to provide an assembly which can be installed in a conventional filter apparatus and provided with photoelectric means for sensing the cake which builds up on the filter elements inside the apparatus.

Another object is to provide an assembly of the character described including a casing having a pair of tubular sight heads disposed to form parts of a light path subject to be interrupted by building up of the filter cake in the filter apparatus.

Still another object is to provide an assembly of the character described including means for clearing the built up filter cake from the light path.

A further object is to provide an assembly of the character described with photoelectric reference means for calibrating indications of the device.

For further comprehension of the invention, and of the objects and advantages thereof, reference will be had to the following description and accompany drawings, and to the appended claim in which the various novel features of the invention are more particularly set forth.

In the accompanying drawings forming a material part of this disclosure:

FIG. 1 is a sectional view through a typical filter apparatus showing a cake detector assembly mounted thereon.

FIG. 2 is a fragmentary side elevational view on an enlarged scale of the apparatus showing external portions of the detector assembly.

FIG. 3 is a sectional view on a further enlarged scale taken on line 3—3 of FIG. 2.

FIG. 4 is a perspective view of a bracket employed in the device.

FIG. 5 is a diagram of an electrical circuit employed in the device.

FIG. 6 is a sectional view similar to a portion of FIG. 3 showing another embodiment of the invention.

FIG. 7 is a diagram of an electrical circuit employed with the embodiment of FIG. 6.

In FIG. 1 is shown a filter apparatus including a generally cylindrical tank 10 provided with an inlet pipe 12 through which flows a fluid in either liquid or gaseous form entraining material to be separated by filtration. The apparatus contains a plurality of precoated porous leaves or plates 14 which strain the fluid passing thereover and therethrough as indicated by arrows F. The filtered fluid flows out of either one or both outlet pipes 16, 18. The filtered material and precoat form a sludge or cake upon the filtering devices or plates 14. This cake must be removed when it reaches a certain thickness so that the filtering apparatus can continue to operate efficiently and to prevent damage to the filter leaves. In order to effect continuous automatic watch of the thickness of the cake there is provided a detector device having a detector assembly 20 mounted on the cylindrical wall of the tank. This assembly is shown to best advantage in FIGS. 2–4 to which reference is now made.

A cylindrical, cup-shaped casing 22 is provided with an annular flange 24 secured by bolts 21 and nuts 23 to a pad 25 in the wall of tank 10. The casing 22 has a circular end wall 26 which has two holes 28, 30 in which are inserted tubes or tubular portions 32, 34 of optical sight heads, 36, 38. Nuts 40, 42 are threaded on the tubular portions 32', 34' of heads 36, 38 and coact with flanged portions 41, 43 of the heads. Fiber gaskets 33, 35 seal the openings 28, 30 in the casing 22. The tubular portions 32, 34 have closed ends 44, 46 and laterally extending axially aligned nipples 48, 50. Tapered fittings 49, 51 are threaded on the ends of the nipples. Transparent glass disks 53, 55 are inserted with gasket rings 59 inside the nipples to seal the interiors of heads 36, 38 and prevent entry of the fluid in the filtering apparatus. The aligned axes of the nipples are disposed parallel to and spaced a predetermined distance D from porous filter device 14ª as shown in FIG. 3.

Between the fittings 49, 51 is a space into which cake C indicated by dotted lines in FIG. 3 can collect until it interrupts the optical line of sight S between the heads 36, 38. Mirrors 56, 58 are disposed in the respective heads on the slanting ends of tubes 32 and 34 and are supported by pins 33' extending across the space in the ends of the tubes and supported in the opposed wall portions thereof to bend the optical path O provided by the tubes 32 and 34 in heads 36 and 38, respectively, at right angles to sight line S. The tubes 32 and 34 have slanting ends 36ª and 38ª and the tubes are secured to the tubular portions 32' and 34' by set screw 40'. A lamp 60 is mounted in a tubular housing 62 with lens 62" axially aligned with tubular portion 34 of head 38. The lamp housing is mounted on an adjustable bracket 86 secured to flange 24 by bolt 63 extending through the flange and seated in pad 25. The lamp housing is supported on a pipe coupling ring 88 at one end of the bracket. Nut 65 on the bolt removably secures the bracket on flange 24. A fiber ring gasket 66 seals the tank 10 at the casing 22. An annular steel facing 68 may be applied between flange 24 and gasket 66 to adjust the position of the heads 36, 38 in the tank.

A cylindrical tubular housing 70 is axially aligned with the tubular portion 32 of head 36. In housing 70 is a photoconductive type of photoelectric cell 72 indicated diagrammatically in FIG. 3. An optical path O exists between lamp 60 and cell 72 via mirrors 58, 56. The line of sight passes at S through the interior of the filter tank 10. Housing 70 is supported by ring 88' of another bracket 86'.

Tubular member 80 is centrally mounted in plate 26 and extends axially into the tanks. It has a tapered nozzle 78 spaced a short distance from the ends of fittings 49, 51. It is adapted to discharge a suitable fluid for clearing the space between the nozzles when this is filled by cake C.

Bracket plates 86, 86' have holes 87 near one end and pipe coupling rings 88, 88' at the other end; see FIGS. 2 and 4. Housings 62 and 70 have nipples 89 secured in the couplings 88, 88'. Threaded bolts 63 pass through holes 87 and registering holes in the flange 24 and are seated in tapped holes in pad 25. Bolts 63 are engaged by nuts 65 to hold the brackets on flange 24.

FIG. 5 shows a circuit 100 associated with the apparatus. Wires 92 are connected to the photoelectric cell 72. Wires 93 are connected to lamp 60. Battery 94 or any other suitable power supply is connected to wires 93. The battery is also connected to one terminal of amplifier transistor 95 by wire 97. A relay 96 is connected in the output circuit of the transistor amplifier. A meter M may be connected in the amplifier output alternatively to or in addition to the relay 96. Resistor 101 is in series with cell 72 across the battery. The relay has normally an open switch 108 between contacts 103, 104 in series with lamp 105 and battery 102.

In operation of the apparatus, the line of sight S from lamp 60 is interrupted by the building up of a cake C on the filter device plate 14$^a$. This decreases the light normally illuminating the cell 72 so that its resistance increases. The output of the transistor increases to operate the relay and close contacts 103, 104. Signal lamp 105 lights. The meter M indicates the extent to which the light impinging on cell 72 is decreased and furnishes a measure of the thickness of the filter cake. Both the meter M and lamp 105 provide signals to an operator to open the filter tank and remove cake C or to flush out the cake by suitable known means. Alternatively, a signal is applied to an automatic control station via wires 107 (FIG. 5) to effect operation of the filter apparatus controls automatically.

In FIG. 6 is shown another embodiment of the invention in which parts corresponding to those of FIGS. 1–4 are identically numbered. In this embodiment a lamp 110 is mounted in a housing 112 and centrally supported on the inner plate 26' of casing 22'. Two nipples 114, 116 extend in opposite directions diametrally of the housing 112. The nipples are sealed by glass disks or lenses 118 in tapered fittings 120, 122 on the ends of nipples 114, 116. Head 36 is arranged as described in connection with FIGS. 1–4 and its tubular end 48 is axially aligned with nipple 114 in sight line S. Head 38' is arranged like head 38 with its tubular end 50 axially aligned in sight line S' with nipple 116. Tubular members 80$^a$ and 80$^b$ are supported in plate 26' and extend into the tank 10 to clear accumulated cake from the space between housing 112 and heads 36, 38'. In housing 62' aligned with head 38' is a photoelectric cell 123 in place of lamp 60 provided in housing 62. The line of sight S' between housing 112 and head 38' is located well beyond the limit line L of normal cake growth. The head 38' is preferably located opposite support plate 124 supporting filter element 14$^a$. Photoconductive cell 72' is located in housing 70.

FIG. 7 shows a bridge circuit 150 which may be associated with the apparatus of FIG. 6 for measuring the building up of the cake in apparatus. Lamp 110 illuminates photoelectric cells 72' and 123 via independent optical paths O and O'. Cell 72' is located in series with variable resistor 149 in one arm of a Wheatstone bridge between terminals 132 and 137. Cell 123 is located in series with variable resistor 139 in another arm of the bridge including wires 146 between terminals 137 and 131. Resistor 134 is connected between terminals 131 and 136 in a third arm of the bridge. A meter M' is connected across the bridge between terminals 131 and 132. Battery 144 is connected to opposite diagonal terminals 136 and 137. A variable resistor 145 is interposed in wire 151 between battery 144 and cell 110, Resistor 135 is connected between terminals 136 and 132 in a fourth arm of the bridge. A meter M' is connected across the bridge between terminals 131 and 132. Battery 144 is connected to opposite diagonal terminals 136 and 137. A variable resistor 145 is interposed in wire 151 between battery 144 and cell 110.

The bridge circuit will normally be balanced and equal currents will flow through the photoconductive cells 72' and 123 when no filter cake interrupts the line of sight S. The bridge will become unbalanced as the cake builds up in the line of sight S while no cake builds up in the line of sight S', to cause meter M' to indicate the extent of unbalance. The meter can be calibrated to indicate thickness of the filter cake, and when a predetermined reading of the meter is reached, this can be taken as a signal to start the filter cleaning operation.

There has thus been provided, according to the invention, optical photoelectrically controlled means for detecting the presence of a cake building up in a filter apparatus for indicating when the cake has grown to the point where it must be removed for continued efficient operation of the filter apparatus.

While we have illustrated and described the preferred embodiments of our invention, it is to be understood that we do not limit ourselves to the precise constructions herein disclosed and that various changes and modifications may be made within the scope of the invention as defined in the appended claim.

Having thus described our invention, what we claim as new, and desire to secure by United States Letters Patent is:

An assembly for detecting growth of a cake in a filter apparatus comprising a casing adapted for mounting in the filter apparatus, a pair of sight heads projecting from said casing and defining a line of sight therebetween, each of said heads including a tubular member having a mirror disposed therein for reflecting light from said line of sight axially of said tubular member, a lamp disposed in said casing at one end of an optical path including the mirrors and said line of sight, a photoelectric cell disposed in the casing at the other end of said optical path for illumination by said lamp, whereby interruption of said line of sight cuts off illumination of said cell, said lamp and cell being mounted in cylindrical housings supported by removable brackets on an annular flange plate at one end of the casing opposite said heads, an illuminating lamp adapted to be actuated upon interruption of said line of sight to signal time for decaking, and a tubular spray member carried by said casing and disposed between the sight heads for clearing filter cake accumulating between the heads in said line of sight.

References Cited in the file of this patent

UNITED STATES PATENTS

| | | |
|---|---|---|
| 2,032,010 | Goodwin | Aug. 9, 1938 |
| 2,297,370 | Siedle | Sept. 29, 1942 |
| 2,371,259 | Patterson | Mar. 13, 1945 |
| 2,476,217 | Pond | July 12, 1949 |
| 2,692,528 | Uhl | Oct. 26, 1954 |
| 3,025,962 | Williams | Mar. 20, 1962 |